United States Patent
Johns et al.

(10) Patent No.: US 8,108,905 B2
(45) Date of Patent: Jan. 31, 2012

(54) SYSTEM AND METHOD FOR AN ISOLATED PROCESS TO CONTROL ADDRESS TRANSLATION

(75) Inventors: Charles R. Johns, Austin, TX (US); Kanna Shimizu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 11/553,008

(22) Filed: Oct. 26, 2006

(65) Prior Publication Data

US 2008/0104711 A1 May 1, 2008

(51) Int. Cl.
*H04L 9/00* (2006.01)
*H04N 7/16* (2011.01)
*G06F 12/14* (2006.01)
*G06F 1/00* (2006.01)
*G09C 1/00* (2006.01)
*G06F 11/30* (2006.01)

(52) U.S. Cl. ............ 726/2; 726/26; 713/161; 713/189; 713/193; 711/163

(58) Field of Classification Search .......... 726/2, 26; 713/193, 161, 189; 711/163
See application file for complete search history.

(56) References Cited

U.S. PATENT DOCUMENTS

| 7,389,427 | B1 * | 6/2008 | McKeen et al. | 713/193 |
| 2005/0015611 | A1 * | 1/2005 | Poisner | 713/189 |
| 2005/0021944 | A1 * | 1/2005 | Craft et al. | 713/161 |
| 2007/0261120 | A1 * | 11/2007 | Arbaugh et al. | 726/26 |

FOREIGN PATENT DOCUMENTS

WO   WO 2005038654 A1 * 4/2005

OTHER PUBLICATIONS

Seongwook Jin; Jaehyuk Huh; "Secure MMU: Architectural support for memory isolation among virtual machines"; Dependable Systems and Networks Workshops (DSN-W), Publication Year: Jun. 2011, pp. 217-222.*
IBM "SPU Isolation Facility" Cell Broadband Engine Architecture, Version 1.0, Aug. 8, 2005, pp. 163-166.
Kanna Shimizu "The Cell Broadband Engine Processor Security Architecture" Apr. 24, 2006, pp. 1-9.

* cited by examiner

*Primary Examiner* — Matthew Smithers
*Assistant Examiner* — Courtney Fields
(74) *Attorney, Agent, or Firm* — Yudell Isidore Ng Russell PLLC

(57) ABSTRACT

A system, method, and computer-usable medium for an isolated process to control address translation. According to a preferred embodiment of the present invention, an isolation region that is accessible only to a first processing unit in a data processing system is created. A loader is executed to load a secure process in the isolation region. If the secure process is determined to be allowed to issue real mode direct memory access commands, real mode direct memory access commands are enabled to allow the secure process to issue non-translated direct memory access commands.

10 Claims, 2 Drawing Sheets

SYSTEM AND METHOD FOR AN ISOLATED PROCESS TO CONTROL ADDRESS TRANSLATION

BACKGROUND OF THE INVENTION

1. Technical Field

The present invention relates in general to the field of data processing systems. More specifically, the present invention relates to the field of securely processing data within data processing systems. Still more specifically, the present invention relates to a system and method for an isolated process to control address translation.

2. Description of the Related Art

The Cell Broadband Engine Architecture (CBEA) and current Cell Broadband implementation provide an application with a secure operating environment called a "Cell Secure Vault". When in a Secure Vault, an application is required to utilize direct memory access (DMA) to bring information into the vault and authenticate and decrypt the information. Likewise, the application must utilize DMA to send secure or encrypted information to system memory. The addresses of the DMA transfers are translated from an effective address, used by the application running in the Secure Vault, to the physical address of system memory. The translation mechanism is typically setup and managed by software, such as an operating system, which executes outside of the secure vault and thus can not be trusted. Since the address translation can not be trusted, an application running in a secure value can not perform a system monitoring function. To prevent attacks on the computer system after boot, a system monitor can be started in a secure vault as part of a secure boot process. Since the secure vault is more resistant to attacks, the system monitor can continually check the integrity of the operating system and other system resources. The system monitor performs the integrity check by performing DMA transfers from the system memory and verifies that the image is the same as the image at boot. However, since the DMAs can be translated to point to other areas of memory, the attack can simply point the system monitor to an unmodified operating system image.

Therefore, there is a need for a system and method for enabling a system monitoring function to operating within a Secure Vault environment to address the aforementioned limitations of the prior art.

SUMMARY OF THE INVENTION

The present invention includes a system, method, and computer-usable medium for an isolated process to control address translation. According to a preferred embodiment of the present invention, an isolation region that is accessible only to a first processing unit in a data processing system is created. A loader is executed to load a secure process in the isolation region. If the secure process is determined to be allowed to issue real mode direct memory access commands, real mode direct memory access commands are enabled to allow the secure process to issue non-translated direct memory access commands.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

In the remainder of this description, a processing unit (PU) can be a sole processor of computations in a device. In such a situation, the PU is typically referred to as a main processing unit (MPU). The processing unit may also be one of many processing units that share the computational load according to some methodology or algorithm developed for a given computational device. For the remainder of this description, all references to processors shall use the term "MPU" whether the MPU is the sole computational element in the device or whether the MPU is sharing the computational element with other MPUs, unless otherwise indicated.

It is further noted that, unless indicate otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated below.

Figure 1:
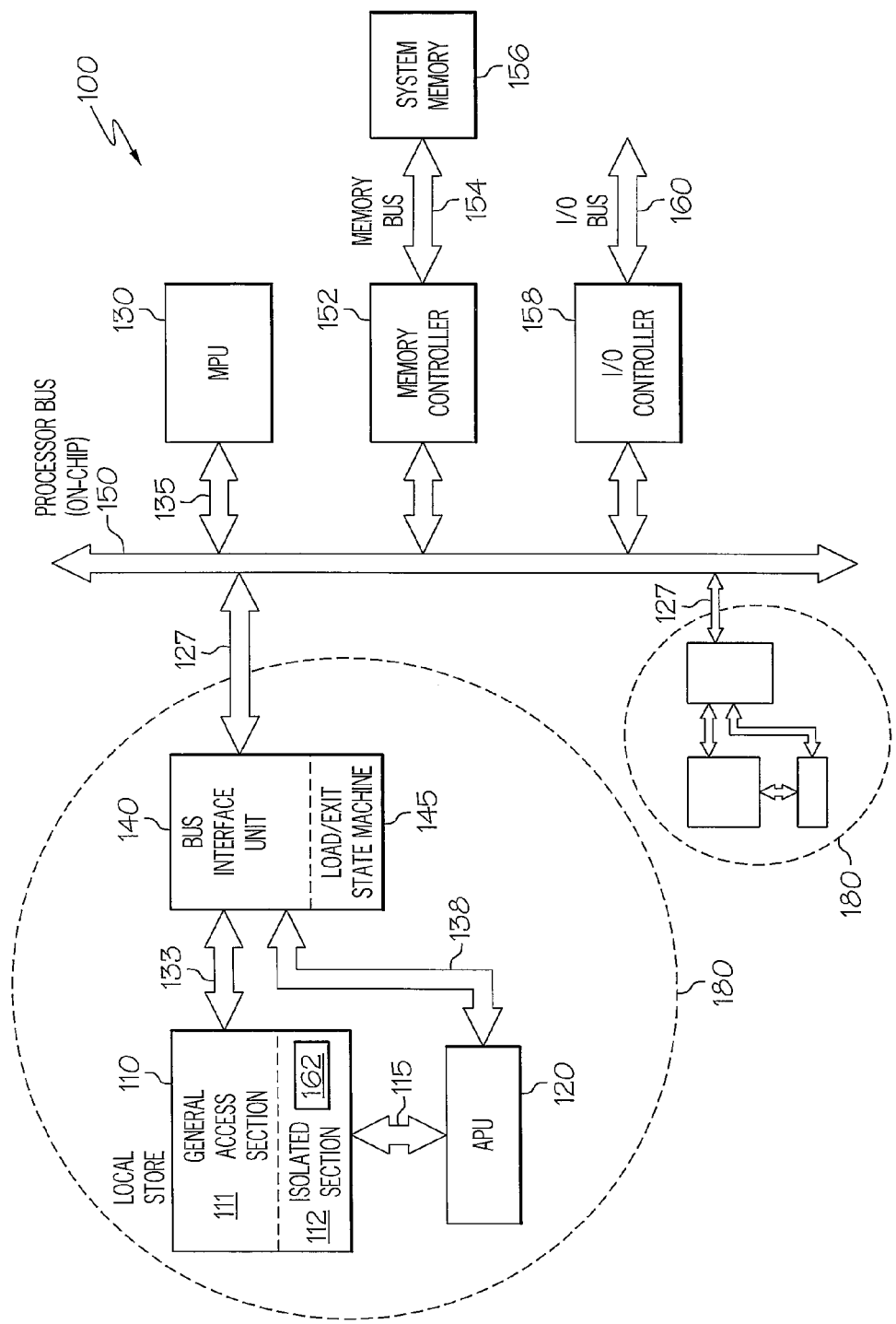
FIG. 1 is a block diagram illustrating an exemplary data processing system in which a preferred embodiment of the present invention may be implemented.

Referring now to the figures, and in particular, referring to FIG. 1, there is illustrated a block diagram depicting an exemplary system 100 for the authentication of code through the partitioning of a local store (LS) 110 into an isolated section 112 and a non-isolated (general access) section 111 according to a preferred embodiment of the present invention. LS 110 is coupled through an LS bus 115 to an attached processor unit (APU) 120. Generally an APU is a processing device that accesses a local memory, such as LS 110, instead of a main, or system memory 156, which is coupled by memory controller 152 and memory bus 154. An APU is preferably designed to run specific commands and routines, which can lead to an increased speed and efficiency of processing. Also stored within isolated section 112 is a system monitor 162, discussed herein in more detail.

LS 110 is further coupled through a bus 133 to a bus interface unit (BIU) 140. Generally, BIU 140 functions as a connection and performs the movement of data, or DMA, between system memory 156 and local storage 110. BIU 140 is coupled through bus 127, to an (on-chip) processor bus 150. Commands to perform the DMA transfers can be sent to the BIU 140 by a main processor (MPU) 130 using the on-chip processor bus 150, or by the APU 120 using the control bus 138. Additionally, APU 120 can be capable of issuing or receiving commands or data from on-chip bus 150 through use of BIU 140. A main processor unit (MPU) 130 to on-chip processor bus 150 via bus 135.

System 100 further includes a load/exit state machine (LESM) 145. LESM 145 includes a master key and utilizes the master key during a load state machine command, also known as a load function. In a preferred embodiment of the present invention, LESM 145 is part of BIU 140. An APU control bus 138 couples LESM 145 to APU 120 and is utilized to convey commands to APU 120 upon execution of a load or exit command by LESM 145. APU control bus 138 can also be utilized by APU 120 to issued commands (such as an exit command) to LESM 145. As depicted in FIG. 1, aggregation of LS 110, APU 120, and BIU 140, and their respective busses can be generally referred to as an attached processor element (APE) 80. The master key is not otherwise accessible, and can be unique to each system.

Preferably, in system 100, secure processing is performed within isolated section 112 memory area of LS 110. The memory inside isolated section 112 is addressable only by APU 120. The external and internal debug, test, and diagnostic interfaces on APU 120 also can not be accessed. However, MPU 130 can access memory in general access area 111. In addition, all DMA transfers are only allowed access to the general access area 111. In other words, MPU 130 can issue load and store or DMA commands to memory locations in LS 110 in either the isolated or non-isolated state, but MPU 130 is restricted to non-isolated region 111 in the isolated state. Commands to APE 180 includes the "load" and "exit" commands, as well as a variety of other commands including starting and stopping APE 180. All commands that provide direct access to a register file, external debug, and control functions or other state of APE 180 that is protected in the isolated state is disabled when APE 180 is in an isolated state.

Isolated section 112 can be invoked by a "load" command" and be released by an "exit" command. When the "exit" command is issued, the entire LS 110 becomes general access memory 111. The load command is preferably issued by MPU 130. The exit command is preferably issued by APU 120, and by MPU 130 in special cases. The load command partitions LS 110 into a general access section 111 and an isolated section 112. The load command additionally transfers code and/or data (load image) from system memory 156 into isolated region 112 of LS 110, and authenticates and/or decrypts the code and data utilizing the master key. Authentication and/or decryption can be performed by such algorithms and functions as secure hash algorithms (SHA), data encryption standard (DES), or the Rivest, Shamir, and Adelman (RSA) algorithm, but those with skill in the art will appreciate that other authentication and decryption functions and algorithms may be utilized to perform the authentication and/or decryption described above.

If a loaded image of an application is successfully authenticated, LESM 145 starts execution of APU 120 at an address within the loaded image in isolated region 112. This code image can then provide further security functions to the system, such as encryption, decryption, authentication, validation of the operating system (for example, at system boot time or after returning from a hibernation state), key management, etc. The exit command clears LS 120 and state information inside APU 120, and de-partitions LS 110 into a single general access section 111. Isolation section 112 limits access to sensitive data and code to load and store instructions issued by APU 120.

In a preferred embodiment of the present invention, a code section is loaded into isolated section 112 and authenticated using the master key. Control is passed to the code that has been loaded, thus completing the "load" function. Then, a secondary application can be loaded, in segments, in isolated section 112, and authenticated with keys that were decrypted from the original code section. The load command provides for the authentication of a loaded application by implementing a key generation and extraction mechanism, such as decryption of a section of the loaded image. Employment of decrypted keys to authenticate the application instead of the use of the master key for all authentications can lead to less exposure of the master key within the system. Besides providing an added level of protection for the master key, this process implements the second load function in software rather than hardware, thus providing additional flexibility and performance for the authentication and/or decryption algorithms used to load the secure applications. Thus, the secure application is validated and authenticated with the decrypted keys that were decrypted with the aid of the master key.

After the code image is authenticated and has finished executing, APU 120 issues and exit command. The exit function, invoked by the exit command, is the only way in which isolated region 112 of LS 110 can be released to be utilized as contiguous memory with general access section 111. The exit command also erases all information in isolated section 112 before releasing the isolated state to general access section 111. The erasure can occur even if processing within system 100 is otherwise in a stopped, paused, or aborted condition. In the latter case, the exit function is preferably invoked by MPU 130.

In a preferred embodiment of the present invention, the exit function is preferably invoked by APU 110. However, once invoked, the exit is performed automatically and can not be stopped. The clearing of the memory within isolated section 112 occurs automatically after the exit command is issued. The exit command can also be invoked if APU 120 is in a non-isolated state, which the exit command functions as a high-speed LS 110 initialization process.

In a preferred embodiment of the present invention, if the code validation and authentication process is deemed to be satisfactory, the load function completes its operation by initiating execution of the loaded code image. However, if the validation process is deemed to be unsatisfactory, APU 120 maintains isolated section 112 within LS 110. APU 120 is thus deemed to be in an isolated state in a non-resumeable, stopped condition. At this point, either a new load request or an exit request can then be issued by MPU 130.

In another preferred embodiment of the present invention, an isolate enable bit is employed to activate the load function and the other attributes of system 100. If this bit is enabled, the ability to accept a load command is enabled. If the isolate enable bit is not enabled, system 100 cannot initiate the creation of isolated region 112. The exit function, however, can be available, regardless of the non-volatile isolate enable bit setting. This allows the exit command to be utilized as a convenient LS 110 initialization process.

In another preferred embodiment of the present invention, prior APU 120 code and related direct memory access data transfer operations are fully completed by any code running in APU 120 before either the load or exit command is issued. In still another preferred embodiment, multiple APUs 120 are combined with a general purpose microprocessor, such as MPU 130, with an on-chip coherent bus. In this embodiment, the operating system runs on the general purpose processor, such as MPU 130, and APUs 120 can be configured dynamically by the operating system to provide either security functions or other tasks.

In another preferred embodiment of the present invention, system 100 has a collection of attached processor elements (APE) 180. Each APE 180 performs its own load and exit transitions, as determined by MPU 130.

Part of the security feature set of the Cell processor is the ability to boot an operating system. The secure boot of the operating system prevents anyone from booting a different operating system than the one provided with the system. However, once booted, an attack can be made on the system to gain control and start a different operating system.

To prevent someone from attacking the system after boot, a system monitor 162 can be started in isolated section 112 as part of the secure boot process. Since isolated section 112 is more resistant to attacks, system monitor 162 can continually check the integrity of the operating system and other system resources. System monitor 162 performs the integrity check task by performing DMA transfers of system memory 156 and verifies that the image is the same as originally booted (along with other checks). However, since the DMAs can be translated to point to other areas of memory, the attack can simply point system monitor 162 to an unmodified operating system image.

The present invention addresses the DMA translation issue by allowing system monitor 162 to control the address translation of the DMAs. The virtual translation is disabled when performing the DMAs to verify the integrity of the operating system in system memory 156. Disabling the address translation allows system monitor 162 to read any real address and be sure the address read is the address provided by the DMA command.

Figure 2:
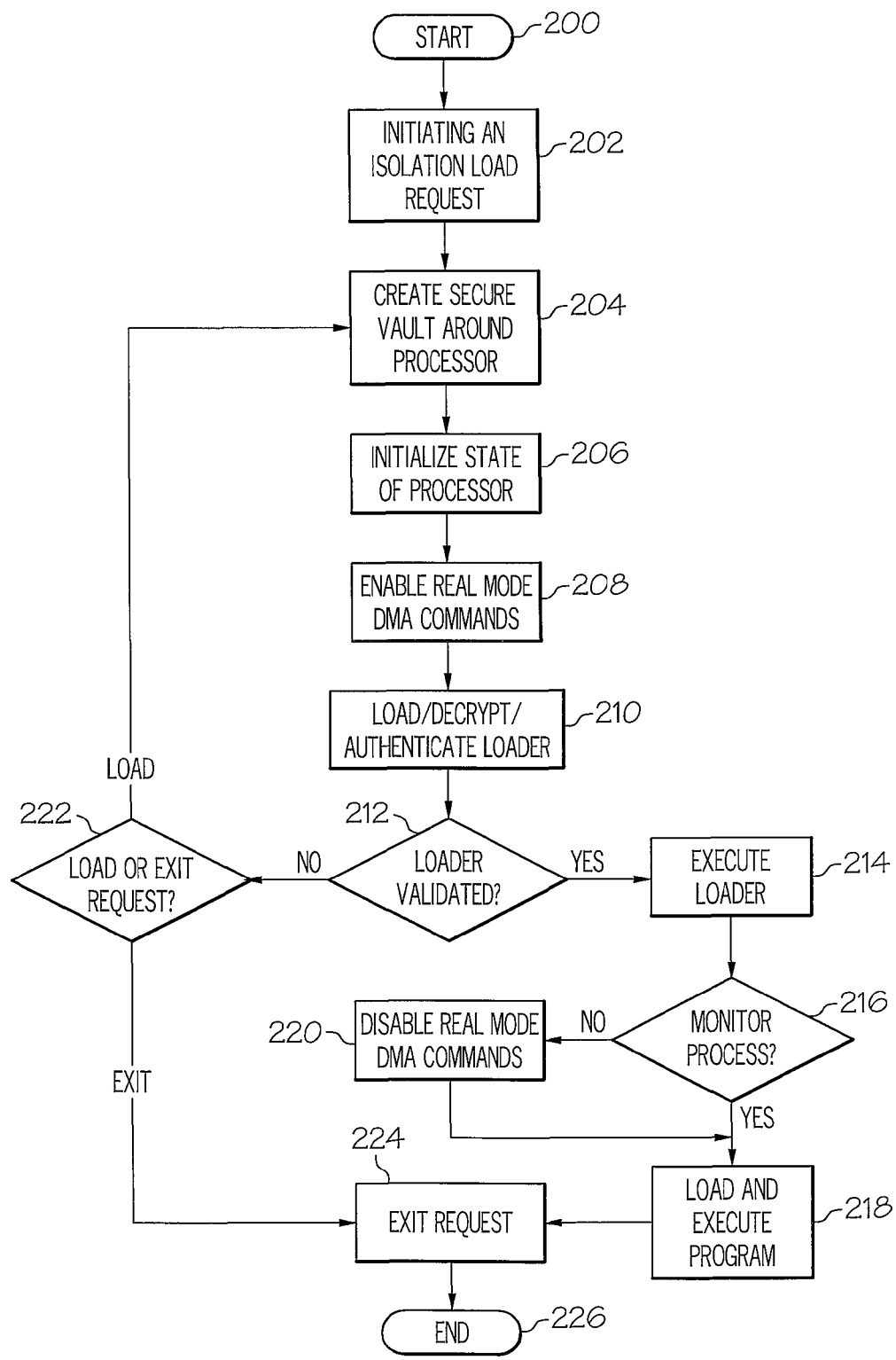
FIG. 2 is a high-level logical flowchart diagram depicting an exemplary method for implementing an isolated process to control address translation according to a preferred embodiment of the present invention.

FIG. 2 is a high-level logical flowchart diagram depicting an exemplary method for implementing an isolated process to control address translation according to a preferred embodiment of the present invention. The process begins at step 200 and continues to step 202, which illustrates MPU 130 initiating an isolation load request. The process continues to step 204, which depicts APE 180 creating a Secure Vault (e.g., isolated state) by partitioning LS 110 into general access section 111 and isolated section 112 and initializing at least the isolated section 112 to a known state. As previously discussed, isolated section 112 may only be accessed by APU 120. In addition, all DMA transfers are re-directed to the general access section 111. The process continues to step 206, which illustrates APE 180 initializing APU 120 to a known state. Any code executing in APU 120 is stopped and all general purpose and special purpose registers are initialized to a known state.

The process proceeds to step 208, which depicts APE 180 enabling a set of real mode direct memory access (DMA) commands that may be utilized by APU 120 during Secure Vault operation. This set of real mode DMA commands give a secure application the ability to select which DMA transfers are translated and ensures that a system monitor function (discussed herein in more detail) can control which areas of system memory 156 are being monitored. Generally, the code image loaded during an isolation load is a loader (discussed later in conjunction with steps 212-214) utilized to securely load and execute a user application. The process continues to step 210, which illustrates LESM 145 loading/decrypting/ authenticating the loader, utilized to securely load and execute a user application.

The process continues to step 212, which illustrates LESM 145 determining if the secure load of the loader has been validated. If the loader has not been validated, the process proceeds to step 222, which illustrates LESM 145 waiting for the MPU 130 to issue a load or exit request. If MPU 130 determines an exit request is appropriate, the process continues to step 224, which illustrates LESM 145 performing an exit. As previously discussed, an exit request de-partitions LS 110 and erases the contents of isolated section 112 and initializes the APU 120 to a known state. The process ends, as illustrated by step 226. Returning to step 222, if APU 120 determines that a new load request is appropriate, the process returns to step 204 and proceeds in an iterative fashion.

Returning to step 212, if LESM 145 has validated the loader, the process continues to step 214, which illustrates APU 120 executing the loader in isolated section 112. The process continues to step 216, which illustrates the loader executing in APU 120 determining if the process will be a system monitor (e.g., system monitor 156). If the process will not be a system monitor (e.g., system monitor 156), the process continues to step 220, which illustrates the loader executing in APU 120 disabling the real mode DMA commands. Providing to any secure process the ability to issue non-translated DMA commands is very dangerous. If allowed any secure process would have the ability to read and modify any area of system memory 156. Therefore, if a system monitoring process is not desired, the loader executing in APU 120 will disable the real mode DMA commands. The process proceeds to step 218. Returning to step 216, if the loader executing in APU 120 determines that the process will be a system monitor 162, the process continues to step 218, which illustrates the loader executing in APU 120 loading and executing a user program in isolated section 112 via the loader that was validated in step 212. When the user program completes execution, the process continues to step 224, which illustrates the user program executing in the APU 120 or MPU 130 issuing an exit request, as discussed above. The process ends, as depicted in step 226.

In another preferred embodiment of the present invention, special DMA commands are implemented as new opcodes. If these new opcodes are issued by a processor (e.g., APU 120) not running in an isolated state or when these commands are not enabled results in an "Invalid DMA command" error and APC 120 would be halted. The enable of the DMA may be implemented as a state variable in a write channel. This write channel would only be visible to an application running in a secure mode. Writing into this write channel with any value would result in the special DMA commands being disabled.

In still another preferred embodiment of the present invention a configuration bit is utilized to select whether the special DMA commands are enabled. If the configuration bit is implemented, a read channel may be provided to allow a system monitor to verify that the DMA commands are enabled. The special DMA command may tag each address of a transfer as a non-translatable address. A memory management unit in APC 180 may also bypass any translations with the non-translatable tag set.

As discussed, the present invention includes a system, method, and computer-usable medium for an isolated process to control address translation. According to a preferred embodiment of the present invention, an isolation region that is accessible only to a first processing unit in a data processing system is created. A loader is executed to load a secure process in the isolation region. If the secure process is determined to be a system monitor, real mode direct memory access commands are enabled to allow the system monitor to issue non-translated direct memory access commands to verify the operating system utilized to boot the data processing system has not been altered since booting the data processing system. One skilled in the art will understand that the system monitor can be any secure process requiring real mode direct memory access.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to Random Access Memory (RAM), and communication media, such as computer and telephone networks including, Ethernet, the Internet, wireless networks, and like network systems. It should be understood, therefore, that such signal-bearing media when carrying or encoding computer-readable instructions that direct method functions in the present invention represent alternative embodiments of the present invention. Further, it is understood that the present invention may be implemented by a system having means in the form of hardware, software, or a combination of software and hardware as described here or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A method for verifying an operating system image utilized to boot a data processing system has not been altered since the booting of said data processing system, said method comprising:
    partitioning a local store unit within an attached processor element into a general access region and an isolation region, wherein said isolation region is accessible only to an attached processor unit within said attached processor element of a data processing system having a main processor unit and a system memory;
    executing a loader to load a secure process in said isolation region, wherein said secure process is a system monitor;
    determining if said secure process is allowed to use real mode direct memory access commands; and
    in response to a determination that said secure process is allowed to use real mode direct memory access commands, enabling real mode direct memory access commands to allow said secure process to issue non-translated direct memory access commands to verify an operating system image utilized to boot said data processing system has not been altered since booting of said data processing system.

2. The method of claim 1, wherein said method further includes authenticating said loader.

3. The method of claim 1, wherein said enabling real mode direct memory access commands further includes enabling a configuration bit readable by the said secure process, wherein said configuration bit enables a set of special DMA command opcodes for real mode direct memory access.

4. The method of claim 1, wherein said method further includes booting said data processing system utilizing said operating system image.

5. The method of claim 1, wherein said method further includes in response to loading said secure process, loading and executing an application within said isolated region.

6. A data processing system comprising:
    a main processing unit;
    a system memory;
    an attached processor element coupled to said main processing unit and said system memory, wherein said attached processor element includes an attached processor unit, a local store unit and a load/exit state machine, wherein said local store unit includes a general access section and an isolated section, wherein said isolated section is accessible only to said attached processor unit, wherein said load/exit state machine
    determines if a secure process is allowed to use real mode direct memory access commands after said secure process has been loaded in said isolated section, wherein said secure process is a system monitor loaded in said isolated section via a loader; and
    in response to a determination that said secure process is allowed to use real mode direct memory access commands, enables real mode direct memory access commands to allow a system monitor within said isolated section to issue non-translated direct memory access commands to verify an operating system image utilized to boot said data processing system has not been altered since booting said data processing system.

7. The data processing system of claim 6, wherein said system monitor performs a system monitor function.

8. The data processing system of claim 6, wherein said real mode direct memory access commands are enabled via a configuration bit readable by said secure process, wherein said configuration bit enables a set of special command opcodes for real mode direct memory access.

9. The data processing system of claim 6, wherein said data processing system is boot by utilizing an operating system image.

10. The data processing system of claim 6, wherein said attached processor unit executes an application within said isolated section.

* * * * *